Figure 1:
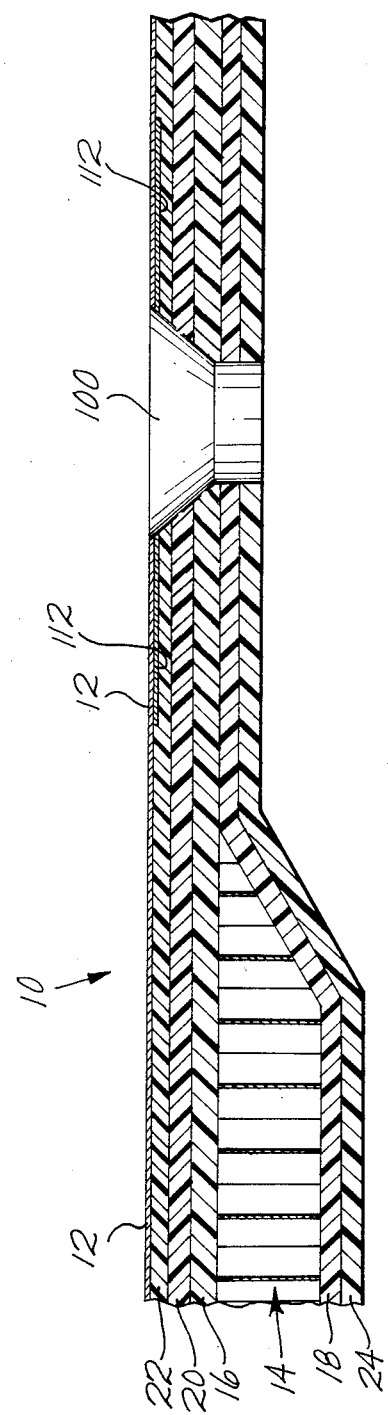

United States Patent [19]

Anglin et al.

[11] Patent Number: 4,599,255
[45] Date of Patent: Jul. 8, 1986

[54] COMPOSITE STRUCTURES HAVING CONDUCTIVE SURFACES

[75] Inventors: Jeanne M. Anglin, Kent; Richard R. Edwards, Bellevue; John E. Thomas, Kent, all of Wash.

[73] Assignee: The Boeing Company, Seattle, Wash.

[21] Appl. No.: 526,838

[22] Filed: Aug. 26, 1983

Related U.S. Application Data

[63] Continuation of Ser. No. 334,855, Dec. 28, 1981, abandoned.

[51] Int. Cl.⁴ ............................ B32B 3/12; B64C 7/00
[52] U.S. Cl. .................................... 428/73; 244/117 R; 244/133; 428/116; 428/137; 428/257; 428/259; 428/285; 428/288
[58] Field of Search ................. 428/73, 116, 257, 259, 428/285, 288, 137; 139/425 R; 361/218; 244/117 R, 123, 125, 126, 133, 136; 264/257

[56] References Cited

U.S. PATENT DOCUMENTS

| | | | |
|---|---|---|---|
| 3,145,000 | 8/1964 | Mackie | 428/73 |
| 4,081,581 | 3/1978 | Littel | 428/137 |
| 4,312,913 | 1/1982 | Rheaume | 139/425 R |

FOREIGN PATENT DOCUMENTS 2413654  9/1975  Fed. Rep. of Germany ...... 428/922

Primary Examiner—Paul J. Thibodeau
Attorney, Agent, or Firm—Conrad O. Gardner; B. A. Donahue

[57] ABSTRACT

A fiberglass fabric wherein a selected number and pattern of yarns have been coated with an aluminum coating is preimpregnated with epoxy or other resin system and laid up as an integral part of a composite structure of the type having a honeycomb core and a plurality of fiberglass plies. Multiple plies of fiberglass fabric which include the yarns coated with an aluminum coating may be utilized in edgeband fastener areas for increased electrical continuity without loss of mechanical strength of composite parts.

3 Claims, 1 Drawing Figure

COMPOSITE STRUCTURES HAVING CONDUCTIVE SURFACES

This is a continuation of application Ser. No. 334,855, filed Dec. 28, 1981, now abandoned.

The present invention relates to non-metallic aircraft composite structural components and more particularly to a method of providing P-static conductivity, lightning strike protection, electrical shielding capability, and conductivity for antenna ground plane usage on non-metallic aircraft composite structures without requiring secondary conductive coatings.

Illustrative in the prior art patent literature in U.S. Pat. Nos. 3,986,530; 3,631,298; 4,034,375; and 4,211,263 is the basic concept of metallizing non-conductive fibers and interweaving such fibers with non-conductive fibers to provide a yarn. Also, the patent literature as illustrated in U.S. Pat. No. 3,986,530 shows the antistatic characteristics of such types of yarns.

In contrast, a preferred embodiment of the present invention utilizes a fabric of selectively metallized yarns which is utilized in the manufacture of a composite part for lightning protection and other conductivity requirements.

Currently, non-metallic aircraft composite parts viz. fiberglass reinforced plastic parts, as utilized in wing-to-body fairing panels, fixed wing leading and trailing edge panels, and trailing edge control surfaces include either a flame sprayed aluminum coating or carbon-filled conductive paint film applied to such structures for required surface conductivity.

It is, accordingly, an object of the present invention to provide composite part structures which include a fiberglass fabric having selected number and pattern of yarns coated with an aluminum coating which selected number may be adjusted to provide predetermined conductivity characteristics of the fabric.

It is a further object of the present invention to provide composite aircraft structures having electrically conductive surface portions without need of increased weight and costly flame sprayed aluminum or paint coatings.

It is yet another object of the present invention to provide a conductive fiberglass fabric which is preimpregnated with epoxy or other resin system and laid up as an integral part in the process of manufacture of an aircraft composite structure.

A full understanding of the invention, and of its further objects and advantages and the several unique aspects thereof, will be had from the following description when taken in conjunction with the accompanying drawing in which:

FIG. 1 is a cross-sectional view showing typical edgeband construction of a composite structure in accordance with a preferred embodiment of the present invention.

Turning now to FIG. 1, there is shown a composite structure 10 having as an integral part, a fiberglass fabric 12 wherein a selected number and pattern of yarns have been coated with an aluminum coating. Fiberglass fabric 12 having a pattern of yarns coated with an aluminum coating is seen in FIG. 1 as the outermost ply of the composite structure which includes a honeycomb core portion 14 sandwiched between outer fiberglass plies 16 and 18. Composite structure 10 includes an additional series of fiberglass plies 20 and 22, intermediate honeycomb core portion 14 and outer fiberglass fabric member 12. The number and pattern of yarns which are coated with an aluminum coating within fiberglass fabric member 12 can be varied to allow precise control of the electrical conductivity properties desired along the surface of the composite part. Utilization of fiberglass fabric member 12 as the outermost ply in the composite aircraft structure 10 is useful for P-static bleed requirements of an outer aircraft surface, or to provide lightning strike protection or for antenna ground plane usage. Fiberglass fabric member 12, if desired to provide electrical shielding for the aircraft composite structure 10, would be utilized as the innermost ply viz. below ply 24 as seen in FIG. 1.

In the manufacture of composite part 10, fiberglass fabric member 12 is preimpregnated with epoxy or other resin system and laid up as an integral part of a detail in the same manner as the other plies 22, 20, 16, 18 and 24 in the detail. After lay up of the impregnated plies, subsequent curing in an oven or autoclave sets the resins to provide the composite structure 10 shown in FIG. 1. This results in a finished part having the required electrical performance with no loss in mechanical strength and no requirements for additional conductive coatings as done in the prior art referenced hereinabove.

Fiberglass fabric member 12 may comprise, for example, type TEF5 or TEF7 obtainable from Hexcel Corporation of Livermore, Calif., and which comprises a fiberglass fabric having a pattern of yarns coated with an aluminum coating interwoven with the fiberglass strands. The aformentioned fabric, when preimpregnated with an epoxy such as type F155 250° F. curing epoxy resin system, may then be laid up with the other preimpregnated fiberglass plies shown in FIG. 1 and cured in an oven or autoclave at 250° F. to achieve the integral composite part 10 shown. Finished parts may then be given a normal decorative enamel finish with no further application of conductive materials. Multiple plies of fiberglass fabric which have yarns coated with aluminum coating as shown at 12 may be utilized in edgeband fastener areas such as around fastener 100 shown in FIG. 1 and comprising additional fiberglass fabric member 112 having also a select number of pattern of yarns coated with an aluminum coating as fabric member 12. The resulting composite structure 10 shown in FIG. 1 results in a finished part having the required electrical performance with no loss in mechanical strength and no requirements for additional conductive coatings, and having the advantages of controlled conductivity of surfaces through predetermined selections of numbers and patterns of yarns utilized in the fiberglass fabric members such as 12 and 112.

What is claimed is:

1. A conductive composite structural member for use in an aircraft structure comprising in combination:
    a fiberglass honeycomb core having inner and outer fiberglass plies;
    a fiberglass fabric including a plurality of electrically non-conductive fibers having electrically non-conductive surface portions interwoven with a plurality of electrically non-conductive fibers having electrically conductive surface portions; and,
    said fiberglass fabric disposed against a surface portion of said inner or outer fiberglass plies.

2. An integral composite structure for aircraft having P-static bleed protection comprising:
    a honeycomb core sandwich having inner and outer fiberglass plies; and, an outer surface of said inner or outer fiberglass plies including a P-static bleed protection layer of fiberglass fabric having a plurality of interwoven strands, said plurality of interwoven strands including interwoven strands having an aluminum coating.

3. An integral composite structure for aircraft including:

a plurality of fiberglass plies;

said plurality of fiberglass plies having an edgeband fastener area surrounding an aperture passing therethrough;

a plurality of layers of fiberglass fabric, each of said layers of fabric including interwoven strands of non-conductive polymeric material having aluminum coatings; and said plurality of fiberglass plies and said plurality of layers of fiberglass fabric forming an integrally disposed sandwich structure in said edgeband fastener area surrounding said aperture.

* * * * *